United States Patent
Parrish

(10) Patent No.: US 10,976,202 B2
(45) Date of Patent: Apr. 13, 2021

(54) WAFER LEVEL PROCESSED MICROBOLOMETER FOCAL PLANE ARRAY

(71) Applicant: Seek Thermal, Inc., Goleta, CA (US)

(72) Inventor: William J. Parrish, Santa Barbara, CA (US)

(73) Assignee: Seek Thermal, Inc., Goleta, CA (US)

(*) Notice: Subject to any disclaimer, the term of this patent is extended or adjusted under 35 U.S.C. 154(b) by 0 days.

(21) Appl. No.: 16/373,460

(22) Filed: Apr. 2, 2019

(65) Prior Publication Data

US 2019/0301942 A1    Oct. 3, 2019

Related U.S. Application Data

(60) Provisional application No. 62/652,229, filed on Apr. 3, 2018.

(51) Int. Cl.
  *G01J 5/04*     (2006.01)
  *G01J 5/20*     (2006.01)
  *G01J 5/00*     (2006.01)

(52) U.S. Cl.
  CPC .................. *G01J 5/045* (2013.01); *G01J 5/20* (2013.01); *G01J 2005/0077* (2013.01); *G01J 2005/204* (2013.01)

(58) Field of Classification Search
  CPC ........ G01J 5/045; G01J 5/20; G01J 2005/204; G01J 2005/0077; G01J 2005/065; G01J 5/046
  See application file for complete search history.

(56) References Cited

U.S. PATENT DOCUMENTS

| | | | | |
|---|---|---|---|---|
| 9,056,764 | B2 * | 6/2015 | Tarn | B81C 1/00269 |
| 2015/0362374 | A1 * | 12/2015 | Wheeler | H01L 37/00 250/332 |
| 2016/0097681 | A1 * | 4/2016 | Buchan | G01J 5/045 250/338.4 |

* cited by examiner

*Primary Examiner* — David P Porta
*Assistant Examiner* — Meenakshi S Sahu
(74) *Attorney, Agent, or Firm* — Knobbe Martens Olson & Bear LLP

(57) ABSTRACT

Focal Plane Arrays (FPAs) or methods to produce FPAs may be provided for a microbolometer based thermal imaging sensor utilizing wafer level processing (WLP) techniques for manufacture. Batch processing techniques for sealing a cap wafer to an FPA wafer to produce vacuum sealed FPAs may be accomplished with suitable FPA design features in conjunction with a glass frit seal methodology utilizing appropriate frit glass compositions.

20 Claims, 3 Drawing Sheets

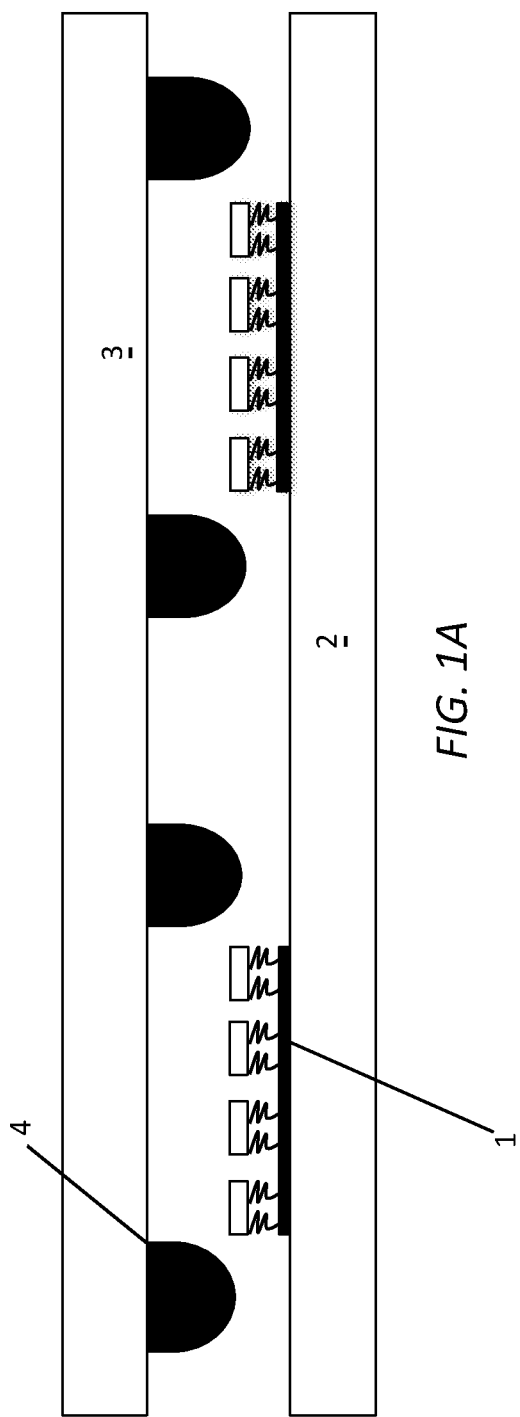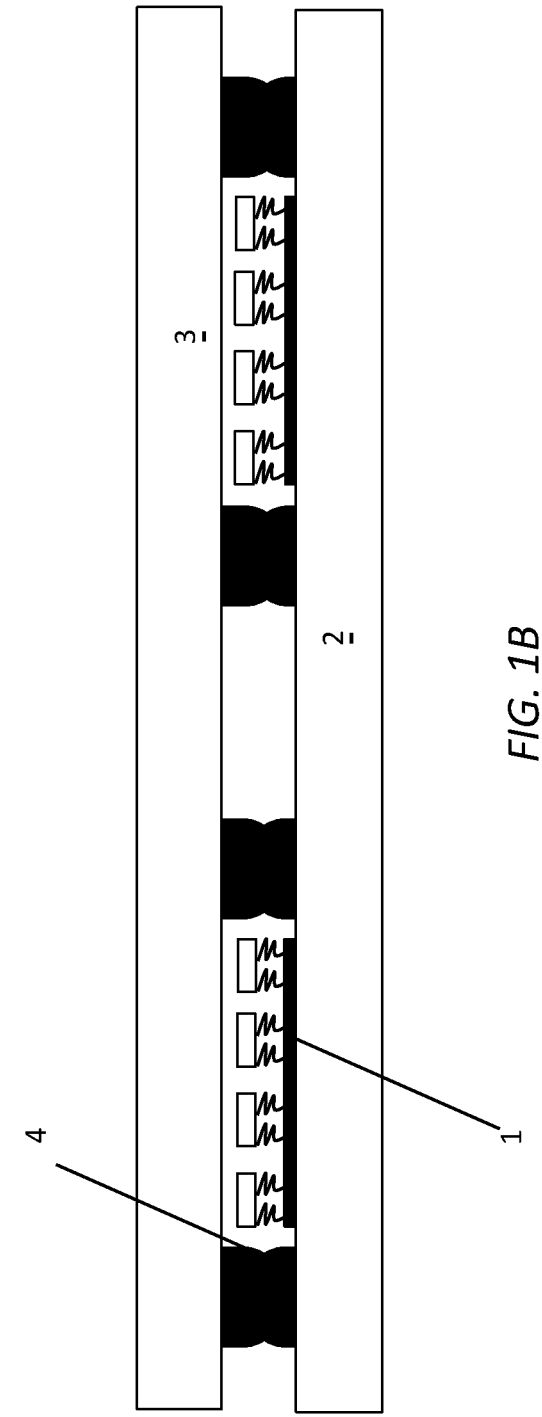

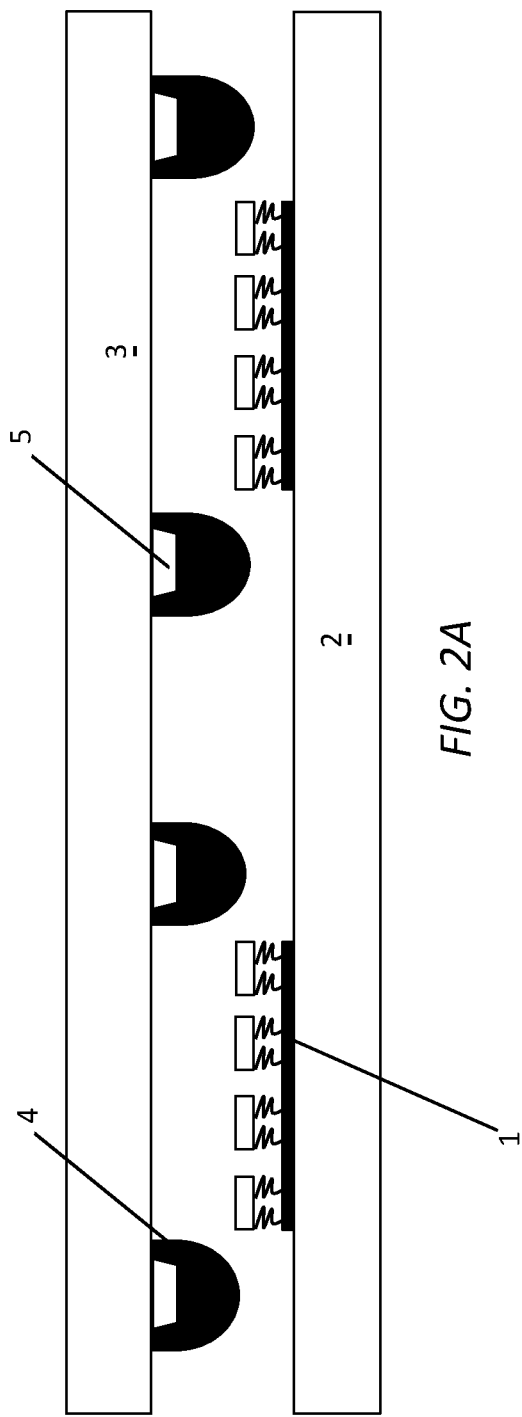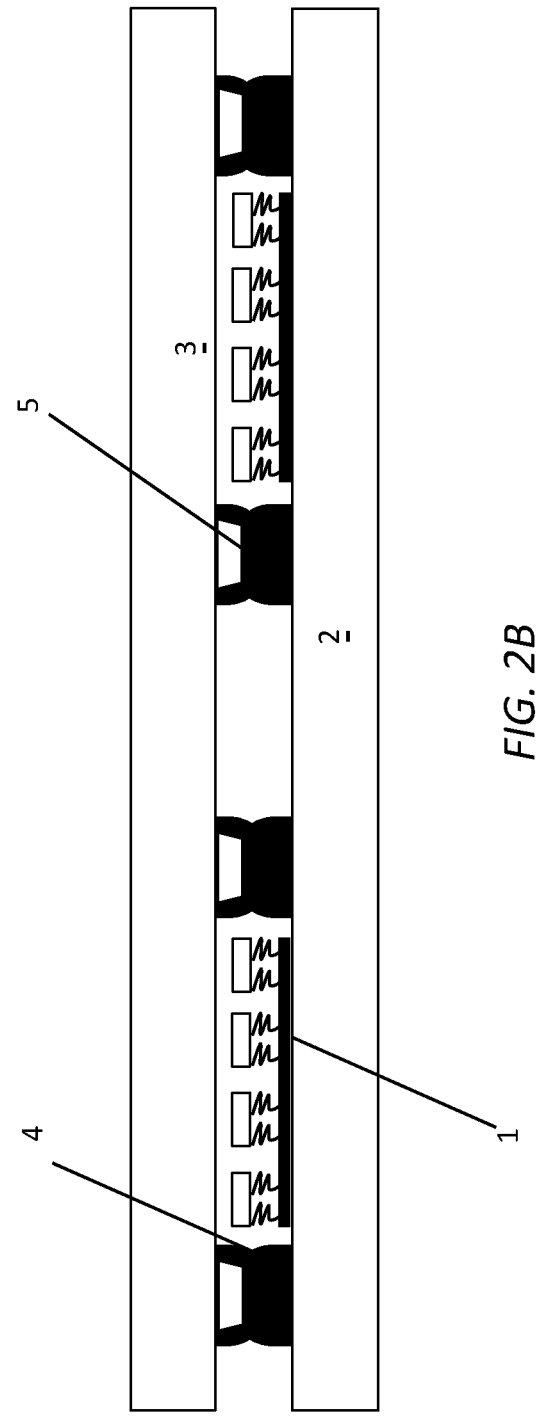

WAFER LEVEL PROCESSED MICROBOLOMETER FOCAL PLANE ARRAY

INCORPORATION BY REFERENCE TO ANY PRIORITY APPLICATIONS

This application claims the benefit of U.S. Provisional Application Ser. No. 62/652,229, filed Apr. 3, 2018, entitled "WAFER LEVEL PROCESSED MICROBOLOMETER FOCAL PLANE ARRAY USING GLASS FRIT SEAL BONDING," which is hereby incorporated by reference in its entirety.

FIELD

This disclosure relates to imaging sensors, and in particular to wafer level processing (WLP) of microbolometer focal plane arrays (FPAs).

BACKGROUND

Low-cost thermal imaging sensors utilizing WLP processing of arrays of microbolometer photodetectors rely on a variety of WLP techniques for their manufacture. Costs may be lowered further if less expensive WLP techniques are developed for microbolometer FPA fabrication.

SUMMARY

Example embodiments described herein have innovative features, no single one of which is indispensable or solely responsible for their desirable attributes. Without limiting the scope of the claims, some of the advantageous features will now be summarized.

In some embodiments, FPAs or methods to produce FPAs may be provided for a microbolometer-based thermal imaging sensor utilizing WLP techniques for manufacture. Batch processing techniques for sealing a cap wafer to an FPA wafer to produce vacuum sealed FPAs may be accomplished with suitable FPA design features in conjunction with a glass frit seal methodology utilizing appropriate frit glass compositions.

In a first embodiment, a thermal imaging focal plane array (FPA) comprises an array of microbolometer thermal photodetectors integrated with readout electronics, microfabricated as an array of dies on a first wafer; a second wafer parallel to and spaced from the first wafer such that the array of dies is disposed between the first wafer and the second wafer; and a glass frit seal disposed between the first wafer and the second wafer, the glass frit seal sealing the second wafer to the first wafer. The glass frit seal material is disposed between the first wafer and the second wafer in a seal structure surrounding a corresponding location of each die of the array of dies, and the glass frit seal comprises a glass frit material having a melting temperature lower than 350 degrees C.

In some embodiments, at least the second wafer comprises a material that is at least partially transparent to thermal radiation. In some embodiments, the melting temperature of the glass frit material is less than 300 degrees C. In some embodiments, the glass frit seal is deposited on the second wafer as a paste and is conditioned at at least two temperatures including a first conditioning temperature lower than the melting temperature and a second conditioning temperature higher than the melting temperature to convert the paste into a glass bond line. In some embodiments, a separation distance between a bottom surface of the second wafer and top surfaces of the microbolometer photodetectors is set by a height of the glass frit seal. In some embodiments, the second wafer comprises one or more raised structures underlying at least a portion of the glass frit seal. In some embodiments, the one or more raised structures improve alignment of the glass frit material and reduce spreading of the glass frit material during deposition of the glass frit material. In some embodiments, a getter is fabricated on a bottom surface of the second wafer for each die. In some embodiments, the getter is positioned to optically occlude at least one reference bolometer when the first wafer and the second wafer are sealed together. In some embodiments, a bond area surrounding each FPA die is configured to have dimensions compatible with glass frit seal printing tolerances.

In a second embodiment, a method of producing a thermal imaging Focal Plane Array (FPA) comprises microfabricating an array of microbolometer thermal photodetectors integrated with readout electronics, as an array of dies on a first wafer; depositing a glass frit material on a bottom surface of a second wafer in a seal structure surrounding one or more areas corresponding to locations of the dies on the first wafer, the glass frit material having a melting temperature lower than 350 degrees C.; and sealing the second wafer to the first wafer by forming a glass frit seal from the glass frit material such that the array of dies is disposed between the first wafer and the second wafer. The second wafer is sealed to the first wafer under vacuum at a sealing temperature of less than 350 degrees C.

In some embodiments, at least the second wafer comprises a material that is at least partially transparent to thermal radiation. In some embodiments, the melting temperature of the glass frit material is less than 300 degrees C., and the sealing temperature is less than 300 degrees C. In some embodiments, the glass frit material is deposited on the second wafer as a paste, and wherein the glass frit material is conditioned at at least two temperatures including a first conditioning temperature lower than the melting temperature and a second conditioning temperature higher than the melting temperature to convert the glass paste into a glass bond line. In some embodiments, after the second wafer is sealed to the first wafer, a separation distance between the bottom surface of the second wafer and top surfaces of the microbolometer photodetectors is set by a height of the glass frit seal. In some embodiments, the method further comprises, prior to depositing the glass frit material, fabricating the second wafer with one or more raised structures underlying a location of the seal structure. In some embodiments, the one or more raised structures improve alignment of the glass frit material and reduce spreading of the glass frit material during deposition of the glass frit material. In some embodiments, the method further comprises fabricating a getter on the bottom surface of the second wafer for each die. In some embodiments, the getter is positioned to optically occlude at least one reference bolometer when the first wafer and the second wafer are sealed together. In some embodiments, a bond area surrounding each FPA die is configured to have dimensions compatible with glass frit seal printing tolerances.

BRIEF DESCRIPTION OF THE DRAWINGS

Aspects and advantages of the embodiments provided herein are described with reference to the following detailed description in conjunction with the accompanying drawings. Throughout the drawings, reference numbers may be re- FIGS. 1A and 1B schematically illustrate an exemplary embodiment of a microbolometer focal plane array (FPA) produced using glass frit seal bonding.

FIGS. 2A and 2B schematically illustrate an exemplary embodiment of a microbolometer FPA with additional features.

DETAILED DESCRIPTION

Figure 3:
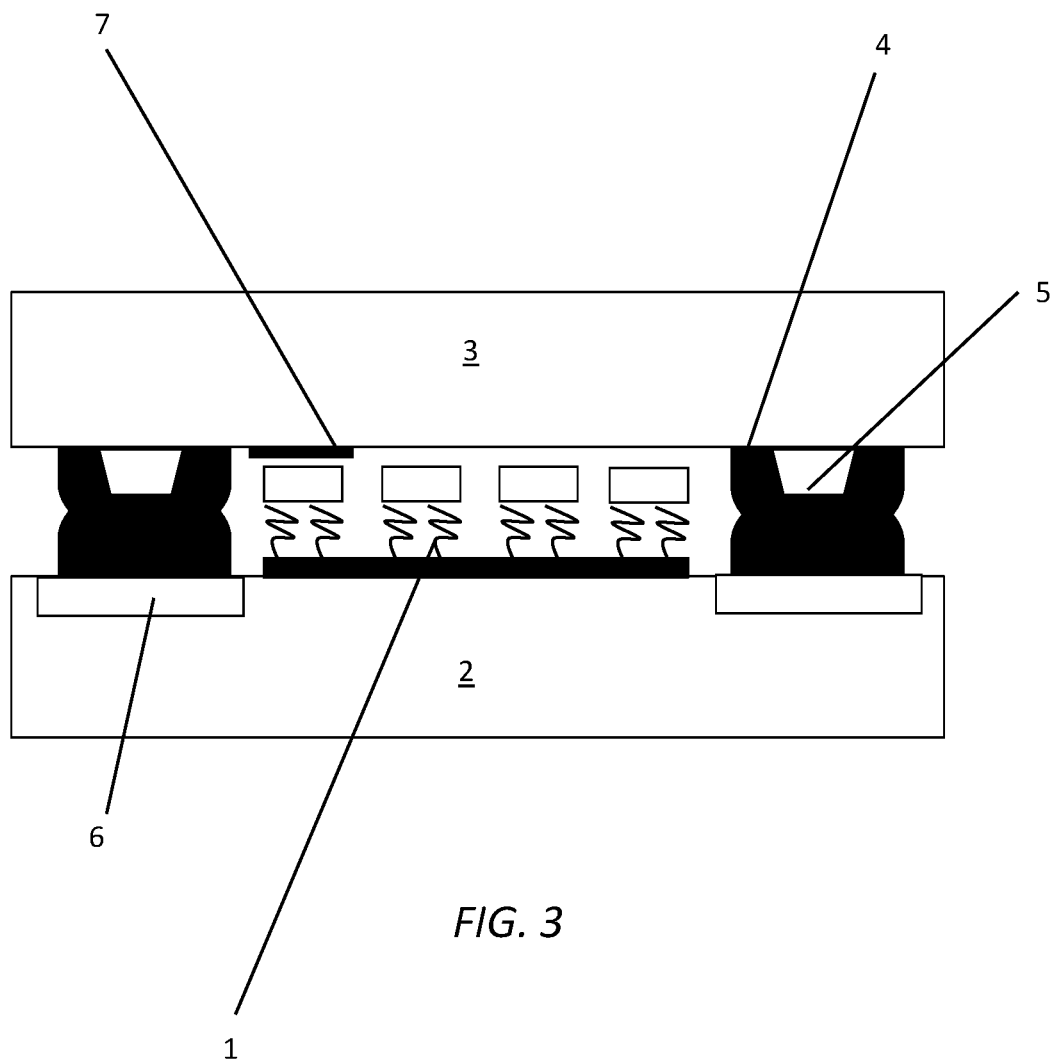
FIG. 3 schematically illustrates an exemplary embodiment of a microbolometer FPA with further additional features.

Generally described, aspects of the present disclosure describe a wafer level processing (WLP) produced thermal imaging focal plane array (FPA) utilizing microbolometer photodetectors and methods for producing the FPA. The FPAs can be fabricated in batch as dies on wafers. For example, the bolometers and readout electronics can be fabricated on a first wafer, and a cap wafer can be bonded to the first wafer (bolometer/readout wafer) under vacuum. Such processing, known as WLP, produces vacuum sealed thermal imaging FPAs in batch.

Certain common elements in WLP processing of microbolometer-based FPAs represent current techniques. The FPA dies or wafers can include a bond area surrounding the bolometer/readout area to accommodate a bonding material to assemble the bolometer/readout (bottom) wafer to the cap (top) wafer. The cap wafer can double as both a vacuum seal as well as an optical window. In some embodiments, the cap wafer can be a thermal match with the bottom wafer. Since silicon has usable transmissive properties at thermal wavelengths and readout/bolometer fabrication is compatible with silicon fabrication techniques, the bottom and top wafers are often silicon. Current WLP usually uses metallic materials with relatively low melting temperatures as the bonding elements between the two wafers. For example, such bonding elements may include gold, gold-tin alloys, or other suitable metallic bonding materials. The microbolometers themselves usually cannot tolerate temperature above 320 degrees C. or even less for some designs. Accordingly, the bonding material melting point in many embodiments may desirably be less than the microbolometer temperature failure level.

Metallic materials may be made very pure, which is beneficial for microbolometer operation as the general consensus is that vacuum levels in sealed dies must remain low during the operational lifetime of the die, so bond material outgassing is a consideration. In addition, most current WLP FPA designs include a cavity for each die, etched into the top wafer on the side facing the bottom wafer to provide a controlled spacing and vacuum cavity over the microbolometer/readout structure on the bottom wafer. In order to accommodate the cavity and uniform optical window thickness, the top wafer may in fact be made from two silicon wafers bonded together (e.g., the bonding may take place before integration with the bottom wafer so low temperature bonding is not necessary). Many WLP FPAs include a getter material to mitigate post processing outgassing, often deposited on the top wafer in the cavity. Thus, current WLP thermal imaging sensor fabrication includes a significant amount of top wafer processing including one or more of high purity bond metal deposition, wafer bonding, cavity etching and getter deposition. The resultant expense associated with current WLP top wafer processing is one impediment to producing lower cost thermal imaging sensors. Moreover the metallic bonding process to deposit metallic bonding material on the top wafers often utilizes expensive, relatively low throughput machinery. Accordingly, top wafer processing for microbolometer FPAs is a major impediment to achieving low cost, high volume FPA production, such as would be required for example to include thermal imaging cameras in mass market products such as smartphones.

Microbolometer FPAs are part of a class of devices known as micro-electro-mechanical systems (MEMS). Many of these microfabricated small silicon devices such as accelerometers, gyroscopes, and others may also require operation under vacuum. Such devices may be incorporated in high volume consumer products such as smartphones. Therefore, the requirement to seal a top sealing cap wafer to a bottom wafer with active devices under vacuum at high volume and low cost is present in MEMS fabrication processes for a variety of devices. One approach to the wafer to wafer bonding process used in some MEMS devices is the use of a melted glass seal, known as a glass frit seal. A general description of glass frit MEMS sealing can be found in chapter 1 of "Handbook of Wafer Bonding" First Edition edited by Peter Ramm et al, 2102 Wiley-VCH Verlag Gmbh & Co. which is incorporated by reference in its entirety. Glass frit bonding is a much less expensive, much higher throughput process than low temperature metallic bonding processes.

Glass frit bonding has not been deemed suitable for microbolometer FPAs for a variety of reasons. Common glass materials used for frit bonding have a melting temperature well above 350 degrees C., which is too high for most bolometer designs to tolerate. Glass frit materials are typically deposited in a paste, a mixture of glass particles and binders which are heat conditioned to remove the binders and leave "pure glass." However, some related material may be left behind, which has the potential to outgas after the top and bottom wafers are bonded. This potential contamination has conventionally been considered unacceptable for microbolometer applications. The glass frit printing deposition process along with melting/wetting characteristics of the glass frit process is considered not dimensionally well controlled enough to be compatible with the small die size needed for microbolometer FPAs. The height of the glass frit bond is not considered compatible with the etched top wafer cavity approach of current WLP FPA designs.

The cost and processing advantages of glass frit bonding provides a motivation to develop an innovative approach to apply this bonding technique to thermal imaging sensor fabrication.

In terms of the melting point, a suitable screen printable glass paste with a low enough glass melting point be utilized. Such materials may be conditioned at higher temperatures to remove binders but may be melted at the bonding step at temperatures between 220 and 300 degrees C. These temperatures are within microbolometer temperature tolerances. The existence of this material indicates that low temperature glass frit seal materials are possible, and for a high volume thermal sensor application, such as incorporation into smartphones, suitable temperature glass frit development may be possible.

Referring to FIG. 1A, an approach using a low temperature glass frit seal for microbolometer FPAs is shown. Glass frit material 4 is deposited onto a silicon top wafer 3. In many cases, the frit material 4 will be deposited in a paste form (e.g., using screen printing techniques or the like) in a bondline surrounding the corresponding area on a bottom wafer 2 containing the microbolometer/readout structure 1, which may be processed on bottom silicon bottom wafer 2. Top wafer 3 with printed glass frit paste bond structure is conditioned at one or more temperatures, at least one of which is above the glass melting temperature. The conditioning as described in the incorporated reference drives out all or part of the solvents, and filler materials, and converts the glass particles into a substantially amorphous glass bondline. As shown in FIG. 1B, the top and bottom wafers are aligned and brought together under vacuum at a temperature sufficient to melt the glass bondline, but not high enough damage the microbolometers. For example, in some embodiments the temperature may be less than 350 degrees C., 320 degrees C., less than 310 degrees C., less than 300 degrees C., etc. The height of the glass bondline after bonding is used as the spacer between the two wafers, eliminating the need for an etched cavity in the top wafer. Advantageously, this process can also maintain a uniform window thickness, e.g., the thickness of the top wafer 3. This ensures that only one wafer is needed for the top wafer with little processing.

As shown in FIGS. 2A and 2B, in some embodiments, an etched structure 5 (e.g., a raised line under the deposited frit material 4) may be included. The etched structure 5 may help to align and/or confine (e.g., reduce spreading of) the paste and subsequent melted bondline.

A shown in FIG. 3, a getter material 7 may additionally be deposited on top wafer 3. For example, the getter material 7 may be deposited on the top wafer 3 prior to assembling the FPA. Getter material 7 may also be positioned to align with one or more reference bolometers, such as to optically occlude the test bolometers. Because of the glass paste temperature conditioning required, the getter will be well fired and should be capable of absorbing sufficient outgassed material from the glass frit if needed.

The bond area 6 allocable to the glass frit bondline may be sized and shaped to account for any additional spreading of the glass frit process compared to a metallic bonding process. For example, as shown in FIG. 3, the bond area 6 is wider than the base of the frit material 4. In one example embodiment, a 300 micron wide bonding area 6 is utilized in each die. This width can accordingly accommodate glass frit spreading as glass frit processing is usually possible with a 250 to 300 micron line width for the bondline. However, if a larger bond area is desired, the improvement in overall processing achieved with a glass frit bond process and associated top wafer configuration can still be more than sufficient to justify reducing the number of dies per wafer to allow more space for wide bond areas.

Glass frit seals may require preconditioning at elevated temperatures. Typically, the conditioning is a three-step process, including a drying step at a temperature around 100 degrees C. to eliminate the paste solvents, an outgassing step to drive out paste binder and filler materials present at a temperature near the glass melting point, and then a glass melt at temperatures above the glass melting point. The result of the steps is to convert the printed paste consisting of glass particles, binders and filler particles to a fused glass bondline, with any remaining filler particles encases within the fused glass. These conditioning steps may be performed on an otherwise finished top wafer, which will include the deposited getter, and at least some of the steps may be done under vacuum, with the wafers held under vacuum until final bonding with the bottom wafer. Therefore, it is possible to arrange the processing so that the getter will be held at elevated temperatures under vacuum for a much longer time than is currently the case for metal bonded WLP imaging sensors. Accordingly, activation of the getter may be improved such that the getter may be more effective at trapping outgassing from the frit material, thereby mitigating the concern that glass frit processing is not clean enough for compatibility with the vacuum requirements of microbolometer operation. It may also be desirable to deposit the getter after one or more of the frit conditioning steps. This could be accomplished, for example, by masking off the frit bondline areas during getter deposition.

Glass frit WLP bonding is compatible with very high volume MEMS production, such as for accelerometers, which are made in very high volumes as they are found in most modern personal electronic devices such as smartphones, tablets and smartwatches. The metallic bonding techniques used in current thermal imager WLP processing are typically not compatible with very high volume production. As thermal imaging modules produced using microbolometer WLP processing find acceptance in applications such as smartphones, the corresponding production volumes can justify overcoming issues with high volume production techniques such as glass frit bonding, as disclosed herein. It is also important to understand that high volume microbolometer-based FPA production would enable customization of the glass frit seal materials to specifically improve bolometer issues such as controlled linewidth and vacuum contamination.

Accordingly, the use of a glass frit bonding technique as disclosed along with associated improvements in top wafer processing addresses all of the current issues preventing the use of glass frit bonding for microbolometer imaging sensors.

The embodiments described herein are exemplary. Modifications, rearrangements, substitute devices, processes, etc. may be made to these embodiments and still be encompassed within the teachings set forth herein. One or more of the steps, processes, or methods described herein may be carried out by one or more silicon microfabrication tools and/or processes.

Depending on the embodiment, certain acts, events, or functions of any of the processes described herein can be performed in a different sequence, can be added, merged, or left out altogether (e.g., not all described acts or events are necessary for the practice of the process).

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or processes illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A thermal imaging focal plane array (FPA), comprising:
   an array of microbolometer thermal photodetectors integrated with readout electronics, microfabricated as an array of dies on a first silicon wafer;
   a second silicon wafer parallel to and spaced from the first silicon wafer such that the array of dies is disposed between the first silicon wafer and the second silicon wafer; and
   a glass frit seal disposed between the first silicon wafer and the second silicon wafer, the glass frit seal sealing the second silicon wafer to the first silicon wafer,
   wherein the glass frit seal material is disposed between the first silicon wafer and the second silicon wafer in a seal structure surrounding a corresponding location of each die of the array of dies, and
   wherein the glass frit seal comprises a glass frit material having a melting temperature lower than 350 degrees C.

2. The method of claim 1, wherein at least the second silicon wafer comprises a material that is at least partially transparent to thermal radiation.

3. The thermal imaging FPA of claim 1, wherein the melting temperature of the glass frit material is less than 300 degrees C.

4. The thermal imaging FPA of claim 1, wherein the glass frit seal is deposited on the second silicon wafer as a paste and is conditioned at at least two temperatures including a first conditioning temperature lower than the melting temperature and a second conditioning temperature higher than the melting temperature to convert the paste into a glass bond line.

5. The thermal imaging FPA of claim 1, wherein a separation distance between a bottom surface of the second silicon wafer and top surfaces of the microbolometer photodetectors is set by a height of the glass frit seal.

6. The thermal imaging FPA of claim 1, wherein the second silicon wafer comprises one or more raised structures underlying at least a portion of the glass frit seal.

7. The thermal imaging FPA of claim 6, wherein the one or more raised structures improve alignment of the glass frit material and reduce spreading of the glass frit material during deposition of the glass frit material.

8. The thermal imaging FPA of claim 1, wherein a getter is fabricated on a bottom surface of the second silicon wafer for each die.

9. The thermal imaging FPA of claim 8, wherein the getter is positioned to optically occlude at least one reference bolometer when the first silicon wafer and the second silicon wafer are sealed together.

10. The thermal imaging FPA of claim 1, wherein a bond area surrounding each FPA die is configured to have dimensions compatible with glass frit seal printing tolerances.

11. A method of producing a thermal imaging Focal Plane Array (FPA), the method comprising:
    microfabricating an array of microbolometer thermal photodetectors integrated with readout electronics, as an array of dies on a first silicon wafer;
    depositing a glass frit material on a bottom surface of a second silicon wafer in a seal structure surrounding one or more areas corresponding to locations of the dies on the first silicon wafer, the glass frit material having a melting temperature lower than 350 degrees C.; and
    sealing the second silicon wafer to the first silicon wafer by forming a glass frit seal from the glass frit material such that the array of dies is disposed between the first silicon wafer and the second silicon wafer,
    wherein the second silicon wafer is sealed to the first silicon wafer under vacuum at a sealing temperature of less than 350 degrees C.

12. The method of claim 11, wherein at least the second silicon wafer comprises a material that is at least partially transparent to thermal radiation.

13. The method of claim 11, wherein the melting temperature of the glass frit material is less than 300 degrees C., and wherein the sealing temperature is less than 300 degrees C.

14. The method of claim 11, wherein the glass frit material is deposited on the second silicon wafer as a paste, and wherein the glass frit material is conditioned at at least two temperatures including a first conditioning temperature lower than the melting temperature and a second conditioning temperature higher than the melting temperature to convert the glass paste into a glass bond line.

15. The method of claim 11, wherein, after the second silicon wafer is sealed to the first silicon wafer, a separation distance between the bottom surface of the second silicon wafer and top surfaces of the microbolometer photodetectors is set by a height of the glass frit seal.

16. The method of claim 11, further comprising, prior to depositing the glass frit material, fabricating the second silicon wafer with one or more raised structures underlying a location of the seal structure.

17. The method of claim 16, wherein the one or more raised structures improve alignment of the glass frit material and reduce spreading of the glass frit material during deposition of the glass frit material.

18. The method of claim 11, further comprising fabricating a getter on the bottom surface of the second silicon wafer for each die.

19. The method of claim 18, wherein the getter is positioned to optically occlude at least one reference bolometer when the first silicon wafer and the second silicon wafer are sealed together.

20. The method of claim 11, wherein a bond area surrounding each FPA die is configured to have dimensions compatible with glass frit seal printing tolerances.

* * * * *